US009204055B2

(12) United States Patent
Ueda

(10) Patent No.: US 9,204,055 B2
(45) Date of Patent: Dec. 1, 2015

(54) IMAGE CAPTURE APPARATUS, CONTROL METHOD THEREOF, AND RECORDING MEDIUM

(75) Inventor: Haruhisa Ueda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 695 days.

(21) Appl. No.: 13/156,020

(22) Filed: Jun. 8, 2011

(65) Prior Publication Data

US 2012/0002098 A1 Jan. 5, 2012

(30) Foreign Application Priority Data

Jul. 5, 2010 (JP) ................................ 2010-153479

(51) Int. Cl.

| | |
|---|---|
| ***H04N 5/235*** | (2006.01) |
| ***H04N 5/77*** | (2006.01) |
| ***H04N 5/907*** | (2006.01) |
| ***H04N 9/804*** | (2006.01) |

(52) U.S. Cl.

CPC .............. *H04N 5/235* (2013.01); *H04N 5/772* (2013.01); *H04N 5/907* (2013.01); *H04N 9/8042* (2013.01)

(58) Field of Classification Search

CPC ... H04N 5/23232; H04N 5/353; H04N 5/235; H04N 5/772; H04N 5/907; H04N 9/8042

USPC ................ 348/208.99, 208.13, 222.1, 229.1, 348/230.1, 231.2, 231.3, 241, 362, 363, 348/364, 367; 396/322, 323

See application file for complete search history.

(56) References Cited

U.S. PATENT DOCUMENTS

| | | | | |
|---|---|---|---|---|
| 7,424,213 | B2 * | 9/2008 | Imada | 396/55 |
| 7,884,856 | B2 * | 2/2011 | Niikura | 348/221.1 |
| 8,036,486 | B2 * | 10/2011 | Sakurai et al. | 382/274 |
| 8,081,220 | B2 * | 12/2011 | Kawai | 348/208.12 |
| 8,237,811 | B2 * | 8/2012 | Minakuti et al. | 348/229.1 |
| 2003/0117518 | A1 * | 6/2003 | Pyle | 348/364 |

FOREIGN PATENT DOCUMENTS

| | | |
|---|---|---|
| JP | 06-121222 | 4/1994 |
| JP | 2001-008091 A | 1/2001 |

(Continued)

OTHER PUBLICATIONS

Jan. 31, 2014 Japanese Office Action that issued in Japanese Patent Application No. 2010-153479.

*Primary Examiner* — Twyler Haskins
*Assistant Examiner* — Peter Chon
(74) *Attorney, Agent, or Firm* — Cowan, Liebowitz & Latman, P.C.

(57) ABSTRACT

An image capture apparatus includes: a capturing unit that captures an object image and generates image data; a setting unit that sets an exposure time for the capturing unit; a composition unit that generates composite image data, in which a predetermined number of pieces of image data have been composed, by dividing the exposure time set by the setting unit into multiple exposure time segments and sequentially composing image data obtained from the capturing unit for each of the exposure time segments into which the exposure time has been divided; and a recording control unit that records, into a recording medium, the composite image data generated by the composition unit and history image data generated by sequentially composing the image data, obtained from the capturing unit, that has been sequentially generated up until the composite image data has been generated.

7 Claims, 6 Drawing Sheets

(56) References Cited

FOREIGN PATENT DOCUMENTS

| | | |
|---|---|---|
| JP | 2001-326851 A | 11/2001 |
| JP | 2003-319252 | 11/2003 |
| JP | 2003-348438 A | 12/2003 |
| JP | 2006-166252 | 6/2006 |
| JP | 3864407 | 12/2006 |
| JP | 2009-130471 A | 6/2009 |

* cited by examiner

IMAGE CAPTURE APPARATUS, CONTROL METHOD THEREOF, AND RECORDING MEDIUM

BACKGROUND OF THE INVENTION

1. Field of the Invention

The present invention relates to image capture apparatuses, and particularly relates to image capture apparatuses that prevent failed images from occurring when capturing images at slow shutter speeds.

2. Description of the Related Art

Thus far, there have been image capturing methods referred to as "slow shutter speed" capturing, in which night scenes are captured, moving objects such as shooting stars, people, or the like are captured so as to have image lag, and so on, by setting a slow shutter speed and carrying out a long exposure. With slow shutter speed capturing, the exposure time is long, and therefore there have been cases where a failed image occurs due to overexposure or blur caused by wind or the like at the end of the exposure; this is problematic in that it is troublesome to capture the image once again. Furthermore, when capturing a moving object as mentioned earlier, there are cases where a failed image results due to the subject being captured in a position not intended by the photographer; this is problematic in that it is difficult to capture the same image again.

Accordingly, techniques that prevent failed images from occurring during slow shutter speed capturing by creating a predictive image following the slow shutter speed capturing and displaying that predictive image in a display device such as a liquid crystal screen have been disclosed, such as, for example, Japanese Patent Laid-Open No. 06-121222 (referred to as "Patent Document 1" hereinafter). Meanwhile, Japanese Patent No. 3864407 (Patent Document 2), Japanese Patent Laid-Open No. 2003-319252 (Patent Document 3), and Japanese Patent Laid-Open No. 2006-166252 (Patent Document 4) disclose capturing techniques that employ divided exposure.

However, with the conventional technique disclosed in the aforementioned Patent Document 1, blur occurring at the end of exposure due to wind or the like, the movement of the subject when capturing a moving object, and so on are not predicted. In addition, if the image is viewed after capturing and it is determined that the exposure has failed, it is necessary to recapture the image. Meanwhile, with the conventional techniques disclosed in Patent Documents 2, 3, and 4, if the user carries out divided exposure during slow shutter speed capturing, and sequentially releases the shutter while confirming the pre-composition images, a long time lag will occur between the individual divided exposures. For this reason, there has been a problem in that it is difficult to continuously capture the movement of the subject when capturing a moving object. Furthermore, if the camera automatically carries out divided exposure and composes the individual images in order to eliminate the time lag between divided exposures, the individual pre-composition images will be lost after the composition is complete. There is thus a problem in that only the final composite image is recorded in a recording medium such as an SD card, a CF card, or the like, and thus the individual pre-composition images cannot be displayed, used, or the like after the capturing is complete.

SUMMARY OF THE INVENTION

Having been achieved in light of the aforementioned problems, the present invention makes it possible to prevent, to the greatest extent possible, the occurrence of failed images when capturing images at slow shutter speeds.

According to a first aspect of the present invention, an image capture apparatus includes: a capturing unit that captures an object image and generates image data; a setting unit that sets an exposure time for the capturing unit; a composition unit that generates composite image data, in which a predetermined number of pieces of image data have been composed, by dividing the exposure time set by the setting unit into multiple exposure time segments and sequentially composing image data obtained from the capturing unit for each of the exposure time segments into which the exposure time has been divided; and a recording control unit that records, into a recording medium, the composite image data generated by the composition unit and history image data generated by sequentially composing the image data, obtained from the capturing unit, that has been sequentially generated up until the composite image data has been generated.

According to a second aspect of the present invention, a control method, for an image capture apparatus including a capturing unit that captures an object image and generates image data, includes the steps of: setting an exposure time for the capturing unit; generating composite image data in which a predetermined number of pieces of image data have been composed, by dividing the exposure time set by the setting unit into multiple exposure time segments and sequentially composing image data obtained from the capturing unit for each of the exposure time segments into which the exposure time has been divided; and recording, into a recording medium, the composite image data generated in the step of generating and history image data generated by sequentially composing the image data, obtained from the capturing unit, that has been sequentially generated up until the composite image data has been generated.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the appended drawings.

First Embodiment

Figure 1:
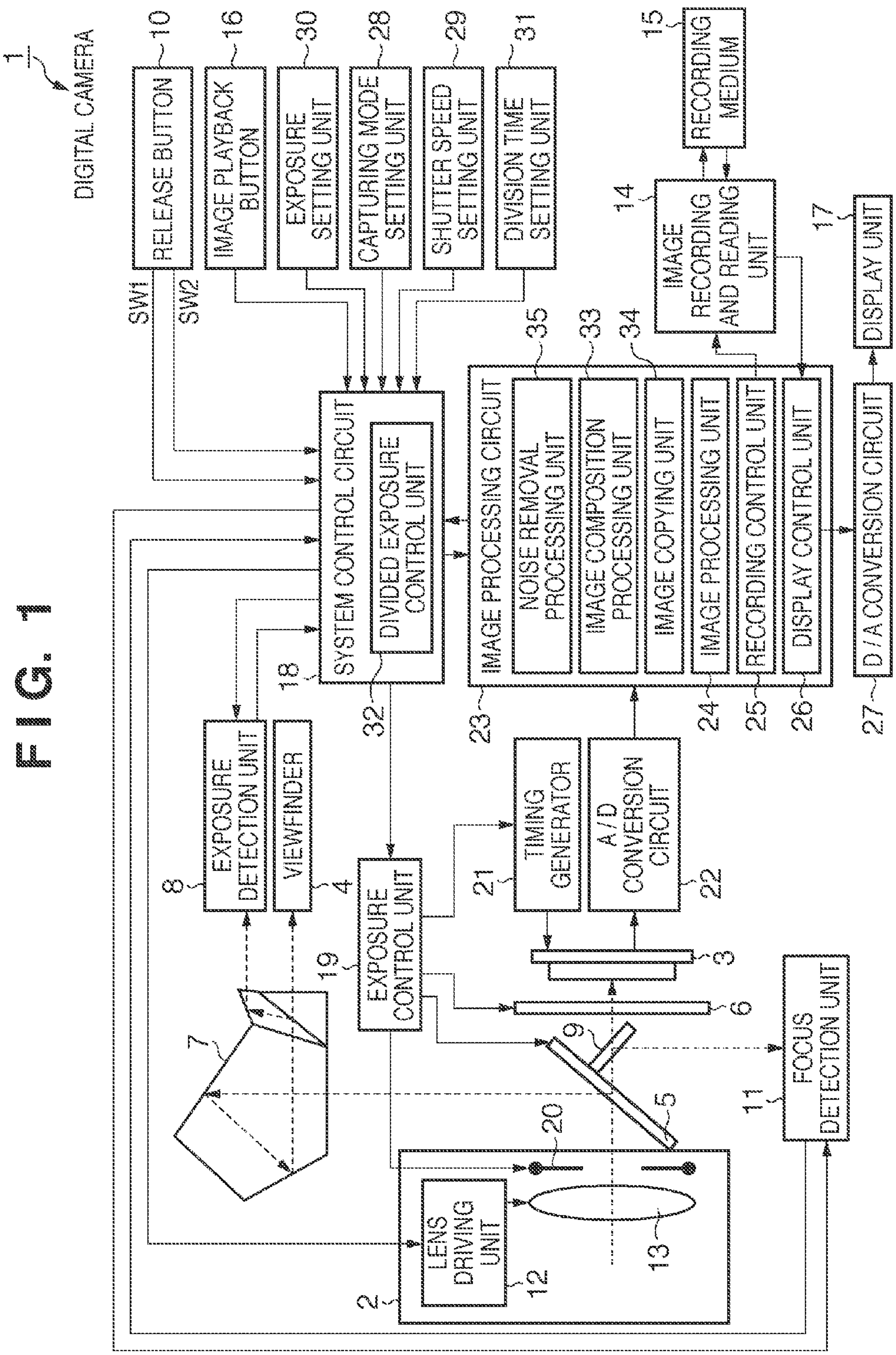
FIG. 1 is a block diagram illustrating the configuration of an image capture apparatus according to a first embodiment of the present invention.

First, the main configuration of a first embodiment of the present invention will be described with reference to FIG. 1. FIG. 1 is a block diagram illustrating the internal configuration of a digital camera 1 serving as an image capture apparatus according to the present embodiment.

A lens unit 2 is provided in the front surface of the digital camera 1, and the configuration is such that light that enters into the lens unit 2 forms an object image upon an imaging element 3 located within the digital camera 1. A main mirror 5 that reflects light toward an optical viewfinder 4 and a shutter 6 are disposed between the lens unit 2 and the imaging element 3. The light reflected by the main mirror 5 is conducted to the optical viewfinder 4 by a pentaprism 7, and is split into light that is diverted to an exposure detection unit 8. The main mirror 5 is a half mirror, and some of the light that has passed therethrough is reflected by a submirror 9, attached in a mobile state relative to the main mirror 5, and then enters into a focus detection unit 11.

When the user presses a release button 10 halfway (SW1), the exposure detection unit 8 commences light measurement, the focus detection unit 11 commences distance measurement, and a lens driving unit 12 in the lens unit 2 commences driving of a focus lens 13. Then, when the user fully depresses the release button 10 (SW2), the main mirror 5 and the shutter 6 disposed in front of the imaging element 3 are driven, and the light from the lens unit 2 enters into the imaging element 3. The imaging element 3 then commences charge storage and charge readout operations, thus carrying out exposure operations. The captured image (image data) is then recorded and saved in a recording medium 15 mounted in an image recording and reading unit 14 provided on a side surface of the digital camera 1. The image saved in the recording medium 15 is displayed in a display unit 17 by pressing an image playback button 16 provided on the rear surface of the digital camera 1.

Next, the digital camera 1 according to the present embodiment includes a system control circuit 18 that carries out overall control of the digital camera 1. The system control circuit 18 is configured of a CPU, an MPU, or the like, and controls the operations of the various circuits and so on described hereinafter. When distance measurement is commenced, the system control circuit 18 controls the lens driving unit 12 based on the output from the focus detection unit 11, and brings the image into focus by driving the focus lens 13 in the direction of the optical axis. The system control circuit 18 also controls an aperture 20, the main mirror 5, the shutter 6, and a timing generator 21 in the lens unit 2, using an exposure control unit 19. The main mirror 5 can be driven to an up position that is outside of the light path from the lens to the imaging element 3, and the submirror 9 also recedes from the imaging light path by folding up relative to the main mirror 5. The shutter 6 is configured so as to have a top curtain and a following curtain, and controls the passage or blocking of light beams from the lens unit 2. When light measurement is commenced, the system control circuit 18 determines the aperture and shutter speed values in accordance with the output from the exposure detection unit 8 and capturing conditions set in advance by the user. The method for setting the capturing conditions will be discussed later.

When capturing operations are commenced by the release button 10 (SW2), the system control circuit 18 controls the aperture 20 to take on the determined value, using the exposure control unit 19. In addition, the system control circuit 18 drives the main mirror 5 and the submirror 9 up/down using the exposure control unit 19 in accordance with the determined shutter speed, and controls the driving of the movement of the top curtain and the following curtain in the shutter 6. Furthermore, the system control circuit 18 uses the exposure control unit 19 to cause the timing generator 21 to output a pulse signal necessary when driving the imaging element 3. The imaging element 3 carries out charge storage and charge readout operations in accordance with the pulse signal output from the timing generator 21. The charge read out from the imaging element 3 is digitized by an A/D conversion circuit 22, and the resulting image is sent to an image processing circuit 23. The image that has been sent undergoes white balance adjustment, image compression processing, and so on in an image processing unit 24 within the image processing circuit 23, and is then recorded and saved into the recording medium 15 via the image recording and reading unit 14 by a recording control unit 25. The recording medium 15 is a typical SD card, CF card, or the like. The captured image saved in the recording medium 15 is loaded into a display control unit 26 within the image processing circuit 23 by the image recording and reading unit 14 upon the image playback button 16 being depressed; the image is then converted to analog by a D/A conversion circuit 27 and is displayed in the display unit 17. The display unit 17 is a typical liquid crystal display, organic EL display, or the like.

Although only the focus lens 13 in the lens unit 2 is described in the present embodiment, the lens unit 2 may also include a zoom lens; furthermore, the lens unit 2 may be an integrated lens, or may be a separate interchangeable lens. In addition, the configuration may be such that the main mirror 5, the submirror 9, and the pentaprism 7 are omitted, the shutter 6 is realized as an electronic shutter using the imaging element 3, and an EVF (electronic viewfinder) or an LV mode displayed in the display unit 17 is used instead of the optical viewfinder 4. In such a case, the imaging element 3 carries out exposure detection instead of the exposure detection unit 8. The configurations mentioned here are publicly known and thus detailed descriptions thereof will be omitted.

Next, a method for setting the capturing conditions will be described. A capturing mode setting unit 28, which is implemented as a dial operation member, can set the capturing mode, and can set, for example, an auto exposure mode, an aperture priority exposure mode (Av), a shutter speed priority exposure mode (Tv), a manual mode (M), or a bulb mode (B). In the case where the manual mode (M) or the shutter speed priority exposure mode (Tv) has been set, the user can set the shutter speed to a desired speed using a shutter speed setting unit 29, which serves as an operation member. The system control circuit 18 controls the exposure control unit 19 based on the value set using the shutter speed setting unit 29, and the shutter 6 is opened by the exposure control unit 19 and carries out exposure for the set amount of time. In the case where the bulb mode has been set, capturing commences when the release button 10 (SW2) is pressed, and the exposure continues while the release button 10 (SW2) is being pressed; the exposure ends when the release button 10 (SW2) is released, and the shutter speed is determined during capturing. In the case where the auto exposure mode or the aperture priority exposure mode (Av) mode has been set, the user sets an appropriate exposure value as desired using an exposure setting unit 30, which is implemented as a dial operation member, and the shutter speed is determined automatically during capturing so as to achieve the appropriate exposure. The determination of the appropriate exposure is carried out by the system control circuit 18, based on information obtained when the exposure detection unit 8 receives light from the lens unit 2. Slow shutter speed exposure capturing can be carried out by setting the shutter speed to be longer in the aforementioned capturing modes.

Figure 2:
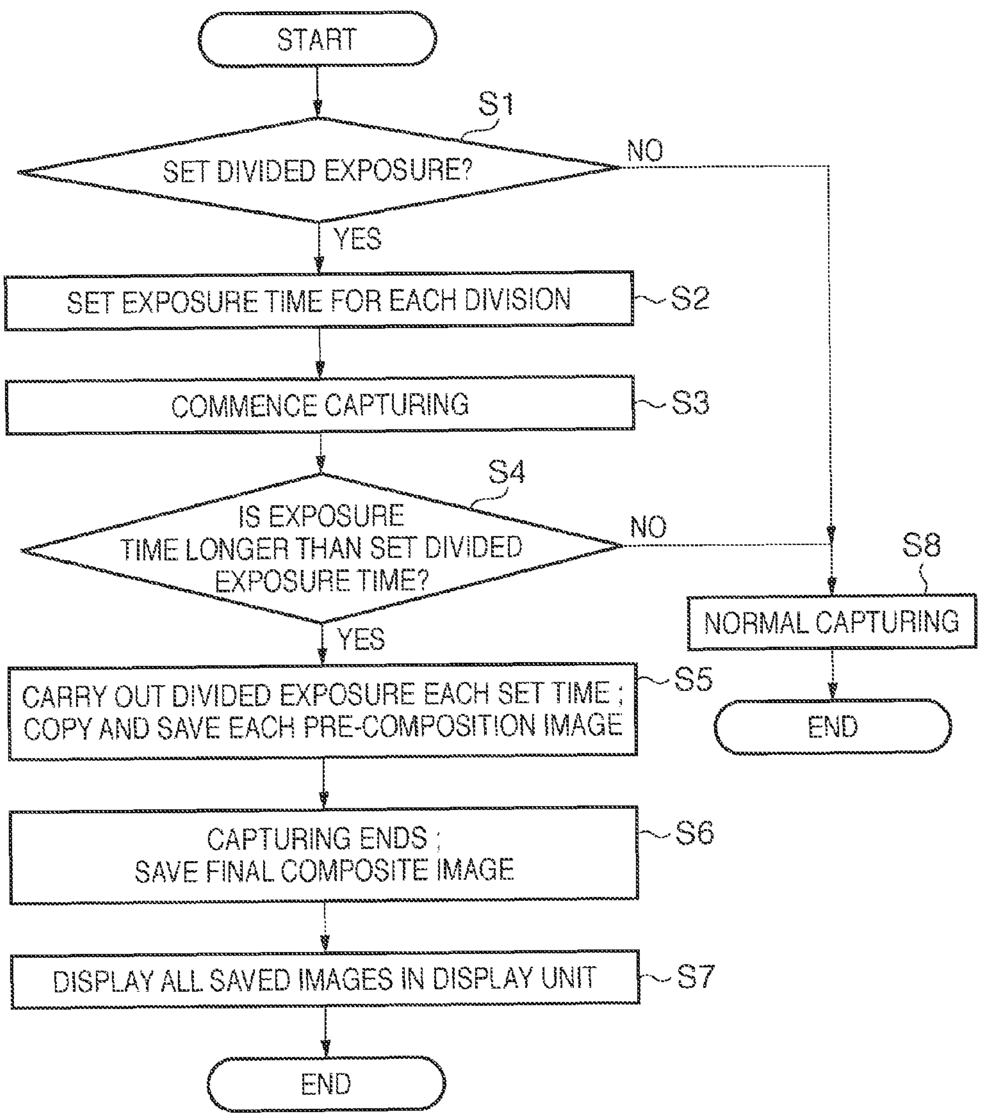
FIG. 2 is a flowchart illustrating operations performed by the image capture apparatus according to the first embodiment of the present invention.

Next, a method for copying and saving history images during slow shutter speed exposure capturing, which is a characteristic of the present embodiment, will be described using the flowchart in FIG. 2, whereas an example of the copying and saving of history images during slow shutter speed exposure capturing will be described using the overall diagram in FIG. 3.

In addition to the elements described above, the digital camera 1 includes a division time setting unit 31 and a divided exposure control unit 32, and the image processing circuit 23 includes an image composition processing unit 33, an image copying unit 34, and a noise removal processing unit 35. The divided exposure control unit 32 is provided in the system control circuit 18. In order to copy and save the history images from slow shutter speed exposure capturing, first, in step S1 of FIG. 2, divided exposure settings are carried out. In the present embodiment, the divided exposure is carried out in order to perform a noise removal process suited to each history image on the history images from the slow shutter speed exposure capturing that will be copied and saved. The method for noise removal will be described later. Note that in the case where noise removal is not to be carried out, the history images may be output from the imaging element 3 every desired amount of time during slow shutter speed exposure capturing that employs continuous exposure, and those history images may be recorded and saved in the recording medium 15.

With respect to the divided exposure settings in step S1, when the user presses the division time setting unit 31, which is a button-type operation member disposed on the rear surface of the digital camera, a selection screen with the options "no divided exposure" or "use divided exposure" is displayed in the display unit 17. In the case where "no divided exposure" has been selected, normal continuous exposure is carried out. However, in the case where "use divided exposure" has been selected, the exposure time for a single division is set in step S2. For example, a division time selection screen including options such as 0.1 sec, 0.5 sec, and 1.0 sec is displayed in the display unit 17, and the exposure time for each division is set accordingly. Note that the settings for the exposure time for each division may be determined by setting the shutter speed and the number of divisions, in addition to the method described above. Meanwhile, the division time setting unit 31 may be a dedicated operation member such as a dial, or a menu button for changing system settings of the digital camera such as image size, operation method, and so on may be provided and the division time setting unit 31 may then be provided as an item that can be set using the menu button.

In step S3, the release button 10 (SW2) is pressed and capturing is commenced. If the exposure time becomes longer than the divided exposure time set in step S2, the divided exposure control unit 32 in the system control circuit 18 determines in step S4 that slow shutter speed exposure capturing is being carried out, and commences divided exposure. The exposure time is determined by the shutter speed set as desired by the user through the aforementioned capturing mode. In step S5, the divided exposure control unit 32 carries out divided exposure in accordance with the set division time, using the exposure control unit 19 to control the shutter 6 and the imaging element 3. In the case where the overall exposure time cannot be divided by the divided exposure time, a fractional time's worth of exposure is carried out at the end. In the case where the exposure time is less than or equal to the divided exposure time set in step S2, normal continuous exposure is carried out, and capturing then ends.

Figure 3:
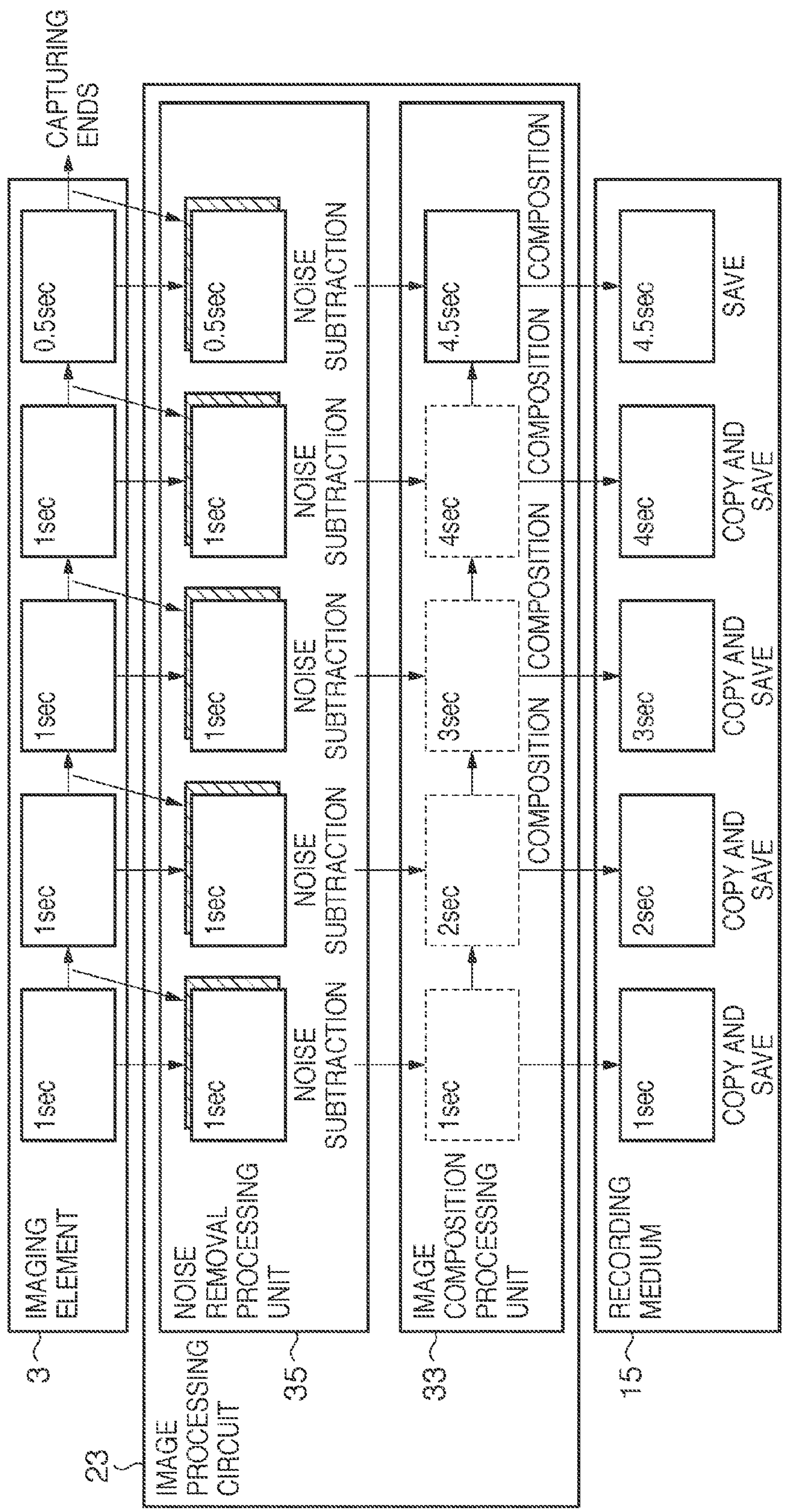
FIG. 3 is a general diagram illustrating operations for copying and saving history images when capturing images using slow shutter speed exposure, according to the first embodiment of the present invention.

As shown in FIG. 3, each image obtained through divided exposure is digitized by the A/D conversion circuit 22 when each exposure is finished, and is then sent to the noise removal processing unit 35 in the image processing circuit 23. In addition, the imaging element 3 sequentially captures black images as noise images for a predetermined amount of time when the shutter 6 closes immediately following the end of each divided exposure, and each black image is sent to the noise removal processing unit 35, in the same manner as each image obtained through divided exposure. In the noise removal processing unit 35, each image obtained through divided exposure undergoes a subtraction process with the corresponding black image captured immediately following the exposure, thus removing the noise. Note that although it is necessary for the capturing time for each black image to be short in order to reduce the time lag between each division, the noise in each image obtained through divided exposure corresponding to the respective black images generally increases along with the capturing time; accordingly, it is necessary for the capturing time for each black image to be the same as that for the corresponding image obtained through divided exposure. For this reason, an amplification process is carried out based on the capturing time of each image obtained through divided exposure that corresponds to the respective black images, which makes it possible to set the exposure time for the black images to be shorter than each divided exposure time. Methods for the amplification process are publicly known, and there is, for example, a method that attaches a temperature sensor to the imaging element and determines the amount of amplification based on the capturing time and the temperature of the imaging element. Alternatively, in order to reduce the time lag between each division, the divided exposure may be carried out by opening the shutter 6 during slow shutter speed capturing and employing an electronic shutter function of the imaging element 3. The electronic shutter function controls the accumulation time (shutter seconds) of the charge accumulated in each light receiving sensor within the imaging element 3, thus controlling the exposure timing and the exposure time for the image obtained through divided exposure. In this case, the noise removal employs black images captured over the same amount of time as the corresponding divided exposure times and recorded in an internal memory (not shown) within the digital camera 1 in advance; the method for carrying out the subtraction process for the corresponding images obtained through divided exposure is publicly known.

Figure 4:
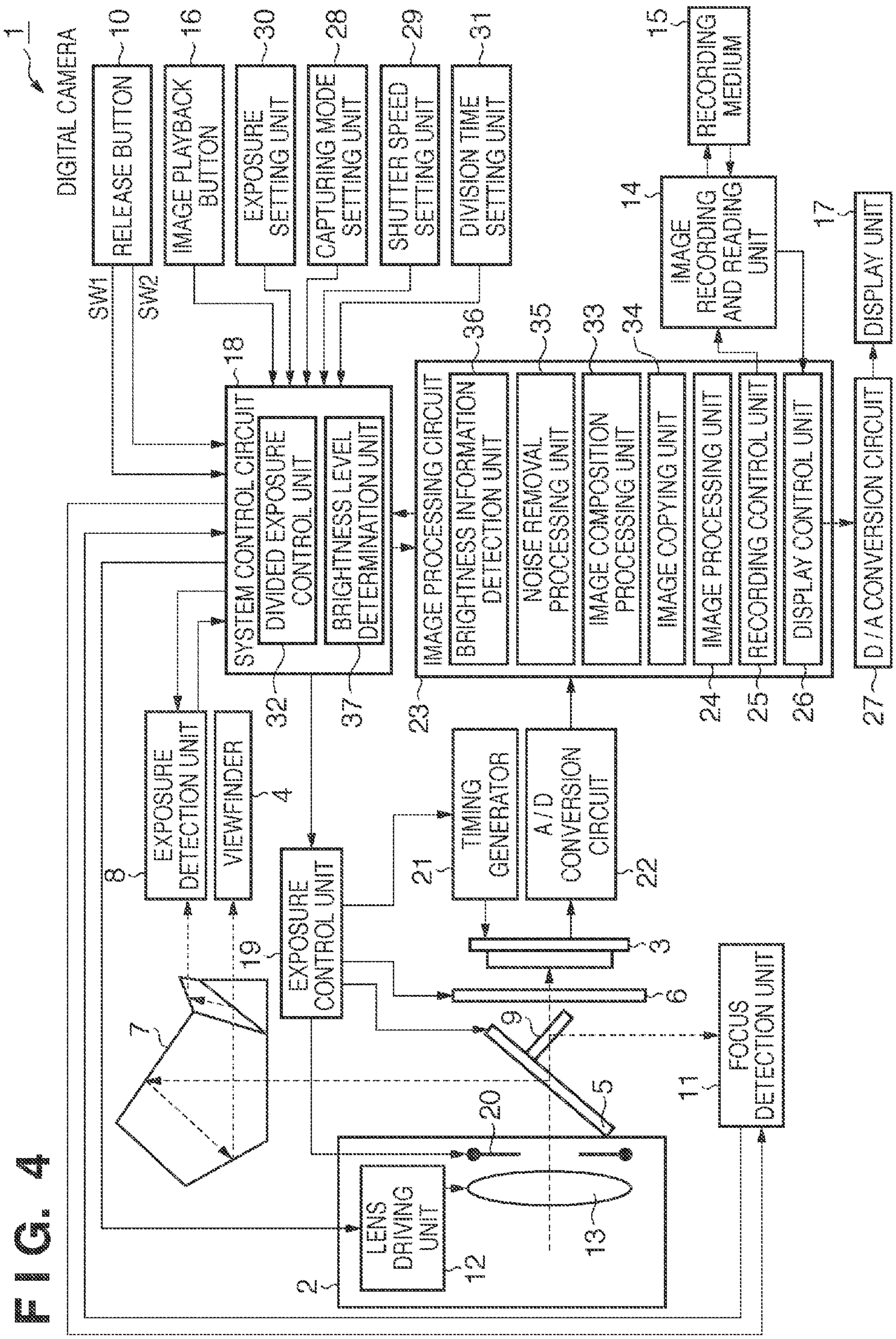
FIG. 4 is a block diagram illustrating the configuration of an image capture apparatus according to a second embodiment of the present invention.

Next, the images from each divided exposure, which have had the noise removed therefrom, are sent to the image composition processing unit 33 within the image processing circuit 23. As shown in FIG. 4, when the first image obtained through divided exposure following the start of capturing is sent to the image composition processing unit 33, the first image is first copied by the image copying unit 34 within the image processing circuit 23 prior to being composed with the second image obtained through divided exposure that is sent thereafter. The first image obtained through divided exposure that has been copied undergoes white balance adjustment, image compression processing, and so on performed by the image processing unit 24, and is then recorded and saved by the image recording and reading unit 14 into the recording medium 15, from the recording control unit 25 within the image processing circuit 23. After that, the first image obtained through divided exposure and the second image obtained through divided exposure are composed by the image composition processing unit 33, thereby generating composed image data. The image resulting from composing the stated first and second images is copied by the image copying unit 34 prior to being composed with the third image obtained through divided exposure, which is sent thereafter, and after undergoing the same various processes performed by the image processing unit 24 on the first image, is recorded and saved into the recording medium 15. In this manner, when sequentially composing a predetermined number of images obtained through divided exposure up until the end of capturing (sequential composition), each pre-composition image is copied by the image copying unit 34, and is recorded and saved into the recording medium 15 (that is, history image data is sequentially generated).

When the capturing ends in step S6, the slow shutter speed exposure image that is ultimately composed undergoes white balance adjustment, image compression processing, and so on by the image processing unit 24, and is then recorded and saved into the recording medium 15. In step S7, each pre-composition history image and the post-composition image saved in the recording medium 15 are sent to the display control unit 26 by the image recording and reading unit 14 when the image playback button 16 is pressed, pass through the D/A conversion circuit 27, and are displayed in the display unit 17. As described thus far, according to the present embodiment, history images during slow shutter speed exposure capturing are recorded and saved for each amount of time that is set as desired, which makes it possible to prevent failed images from occurring during slow shutter speed capturing.

Second Embodiment

A digital camera according to a second embodiment has the same external appearance as that of the first embodiment, illustrated in FIG. 1. Furthermore, the internal configuration illustrated in FIG. 4 is the same as the block diagram illustrated in FIG. 1 that describes the first embodiment, aside from the system control circuit 18 further including a brightness level determination unit 37 and the image processing circuit 23 further including a brightness information detection unit 36. Accordingly, only areas that differ from the first embodiment will be described hereinafter.

Below, a method for copying and saving history images during slow shutter speed exposure capturing, which is a characteristic of the present embodiment, will be described using the flowchart in FIG. 5, whereas an example of the copying and saving of history images during slow shutter speed exposure capturing will be described using the overall diagram in FIG. 6.

The digital camera 1 includes the division time setting unit 31, the divided exposure control unit 32, and the brightness level determination unit 37, and the image processing circuit 23 includes the image composition processing unit 33, the image copying unit 34, the noise removal processing unit 35, and the brightness information detection unit 36. The divided exposure control unit 32 and the brightness level determination unit 37 are provided in the system control circuit 18.

Figure 5:
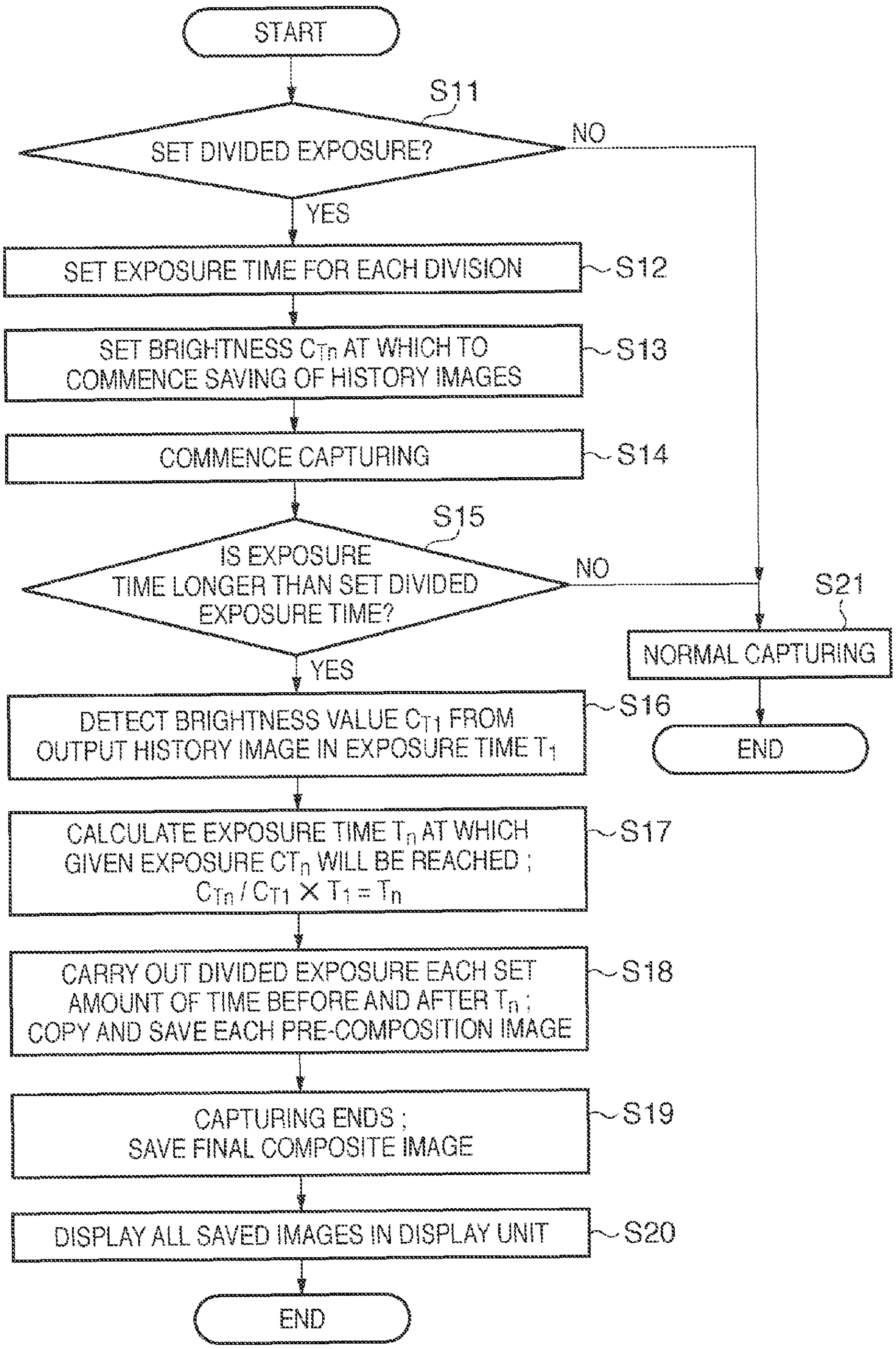
FIG. 5 is a flowchart illustrating operations performed by the image capture apparatus according to the second embodiment of the present invention.

In order to copy and save the history images from slow shutter speed exposure capturing, first, in step S11 of FIG. 5, divided exposure settings are carried out. In the present embodiment, the divided exposure is carried out in order to perform a noise removal process suited to each history image on the history images from the slow shutter speed exposure capturing that will be copied and saved. The method for noise removal will be described later. Note that in the case where noise removal is not to be carried out, the history images may be output from the imaging element 3 every desired amount of time during slow shutter speed exposure capturing that employs continuous exposure, and those history images may be recorded and saved in the recording medium 15.

With respect to the divided exposure settings in step S11, when the user presses the division time setting unit 31, which is a button-type operation member disposed on the rear surface of the digital camera, a selection screen with the options "no divided exposure" or "use divided exposure" is displayed in the display unit 17; in the case where "no divided exposure" has been selected, normal continuous exposure is carried out. However, in the case where "use divided exposure" has been selected, the exposure time for a single division is set in step S12. For example, a division time selection screen including options such as 0.1 sec, 0.5 sec, and 1.0 sec is displayed in the display unit 17, and the exposure time for each division is set accordingly. Note that the settings for the exposure time for each division may be determined by setting the shutter speed and the number of divisions, in addition to the method described above. Meanwhile, the division time setting unit 31 may be a dedicated operation member such as a dial, or a menu button for changing system settings of the digital camera such as image size, operation method, and so on may be provided and the division time setting unit 31 may then be provided as an item that can be set using the menu button.

In step S13, a brightness $C_{Tn}$ at which to commence the copying and saving of history images in the slow shutter speed exposure capturing is set. All of the history images for each division time set in step S12 (S2) are copied and saved following the start of slow shutter speed capturing in the first embodiment, and the images immediately following the start of capturing are dark; thus even unnecessary dark images are copied and saved into the recording medium 15. In recent years, an increase in the number of pixels in imaging elements has led to an increase in the data size of single images, and because there are cases where the capacity of the recording medium 15 is insufficient, it is preferable not to save the unnecessary dark images. Furthermore, because copying and saving all of the images requires lengthy processing time, there are problems such as that the next capturing cannot be carried out immediately after the previous capturing has ended.

Accordingly, in the present embodiment, the copying and saving of history images is started when the given brightness $C_{Tn}$ is reached following the start of slow shutter speed capturing; accordingly, unnecessary dark images (that is, images in which the brightness does not exceed a predetermined value) are not saved, thereby shortening the processing time and preventing the capacity of the recording medium from being wastefully consumed.

The setting of the brightness $C_{Tn}$ can be carried out by the division time setting unit 31, as with the setting of the divided exposure in step S11 and step S12. After the settings in step S11 and step S12 have been carried out by the division time setting unit 31, a brightness $C_{Tn}$ selection screen is displayed in the display unit 17. The brightness $C_{Tn}$ is set by selecting exposure values such as −1 EV, −2 EV, and −3 EV, using an appropriate exposure as a reference. The "appropriate exposure" is a value set as desired by the exposure setting unit 30, as with the capturing conditions during normal capturing, and the light measurement range at which the exposure is detected can be selected as desired, using a spot metering light that detects the brightness of a selected area of the image, such as the center of the image, the distance measurement area of the autofocus, an evaluation metering light that calculates an average of the overall brightness of the image, and so on. Alternatively, the brightness $C_{Tn}$ may be set by providing a dedicated operation member separate from the division time setting unit 31.

In step S14, the release button 10 (SW2) is pressed and capturing is commenced. If the exposure time becomes longer than the divided exposure time set in step S12, the divided exposure control unit 32 in the system control circuit 18 determines in step S15 that slow shutter speed exposure capturing is being carried out. In the case where the exposure time is less than or equal to the divided exposure time set in step S12, the process advances to step S21, where normal continuous exposure is carried out, and capturing then ends. The exposure time is determined by the shutter speed set as desired by the user through the aforementioned capturing mode.

If it has been determined that slow shutter speed exposure capturing is being carried out, in step S16, the divided exposure control unit 32 controls the shutter 6 and the imaging element 3 using the exposure control unit 19, and at least one history image is output through divided exposure. The exposure time of this image is $T_1$ following the start of capturing. The output image is sent to the image processing circuit 23 via the A/D conversion circuit 22, noise is removed by the noise removal processing unit 35, and a brightness $C_{T1}$ at the exposure time $T_1$ is detected by the brightness information detection unit 36. The detection range is the same as the light measurement range for appropriate exposure set in advance.

When the brightness $C_{T1}$ is detected, in step S17, an exposure time $T_n$, at which the brightness $C_{Tn}$ set in advance will be reached is calculated by the brightness level determination unit 37. This can be calculated as, for example, $C_{Tn}/C_{T1}\times T_1=T_n$. Meanwhile, in order to raise the calculation accuracy of $T_n$, multiple history images may be output, the brightness of each of those images may be detected, and $T_n$ may then be calculated using a higher-order function. Next, continuous exposure is carried out until slightly before and after the exposure time $T_n$, and the copying and saving of history images is not carried out. Through this, unnecessary dark images are not saved, thus making it possible to reduce the processing time and prevent the wasteful consumption of the capacity of the recording medium.

When it is slightly before or after the exposure time $T_n$, in step S18, the divided exposure control unit 32 commences divided exposure in accordance with the set division time, using the exposure control unit 19 to control the shutter 6 and the imaging element 3. In the case where the remaining exposure time cannot be divided by the divided exposure time, a fractional time's worth of exposure is carried out at the end.

Figure 6:
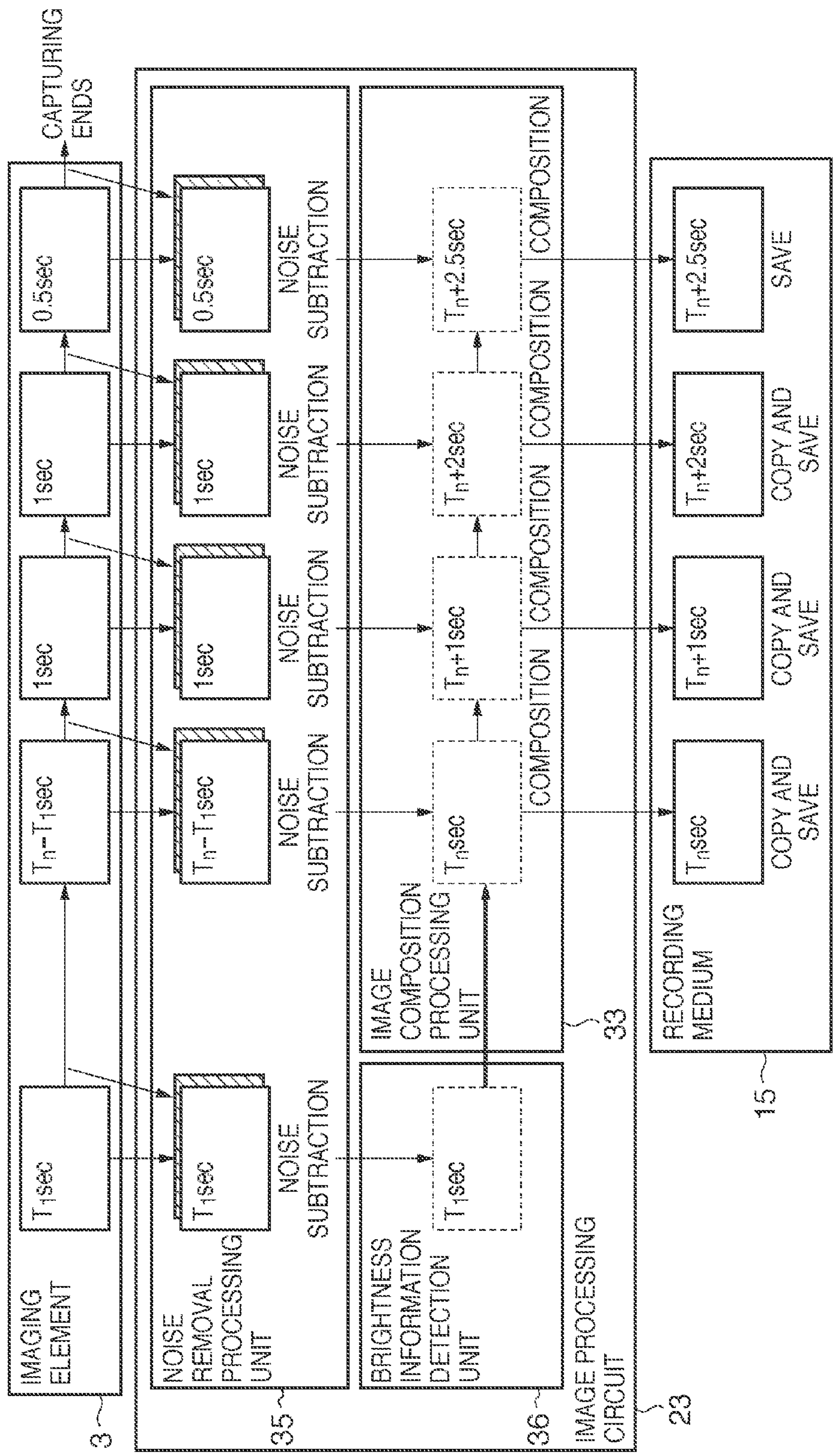
FIG. 6 is a general diagram illustrating operations for copying and saving history images when capturing images using slow shutter speed exposure, according to the second embodiment of the present invention.

As shown in FIG. 6, each image obtained through divided exposure is digitized by the A/D conversion circuit 22 when each exposure is finished, and is then sent to the noise removal processing unit 35 in the image processing circuit 23. In addition, the imaging element 3 sequentially captures black images as noise images for a predetermined amount of time when the shutter 6 closes immediately following the end of each divided exposure, and each black image is sent to the noise removal processing unit 35, in the same manner as each image obtained through divided exposure. In the noise removal processing unit 35, each image obtained through divided exposure undergoes a subtraction process with the corresponding black image captured immediately following the exposure, thus removing the noise. Note that although it is necessary for the capturing time for each black image to be short in order to reduce the time lag between each division, the noise in each image obtained through divided exposure corresponding to the respective black images generally increases along with the capturing time; accordingly, it is necessary for the capturing time for each black image to be the same as that for the corresponding image obtained through divided exposure. For this reason, an amplification process is carried out based on the capturing time of each image obtained through divided exposure that corresponds to the respective black images, which makes it possible to set the exposure time for the black images to be shorter than each divided exposure time. Methods for the amplification process are publicly known, and there is, for example, a method that attaches a temperature sensor to the imaging element and determines the amount of amplification based on the capturing time and the temperature of the imaging element. Alternatively, in order to reduce the time lag between each division, the divided exposure may be carried out by opening the shutter 6 during slow shutter speed capturing and employing an electronic shutter function of the imaging element 3. The electronic shutter function controls the accumulation time (shutter seconds) of the charge accumulated in each light receiving sensor within the imaging element 3, thus controlling the exposure time. In this case, the noise removal employs black images captured over the same amount of time as the corresponding divided exposure times and recorded in an internal memory (not shown) within the digital camera 1 in advance; the method for carrying out the subtraction process for the corresponding images obtained through divided exposure is publicly known.

Next, the images from each divided exposure, which have had the noise removed therefrom, are sent to the image composition processing unit 33 within the image processing circuit 23. As shown in FIG. 6, when the first image obtained through divided exposure at the exposure time ($T_n=T_1$) output after the start of the divided exposure is sent to the image composition processing unit 33, that image is composed with the image obtained through divided exposure at the exposure time $T_1$ output for detecting the brightness $C_{T1}$, resulting in an image corresponding to the exposure time $T_n$. That image is then copied by the image copying unit 34 in the image processing circuit 23 prior to being composed with the second image obtained through divided exposure that is sent next. The image obtained through divided exposure that has been copied undergoes white balance adjustment, image compression processing, and so on performed by the image processing unit 24, and is then recorded and saved by the image recording and reading unit 14 into the recording medium 15, from the recording control unit 25 within the image processing circuit 23.

After this, the image at the exposure time $T_n$ is composed, by the image composition processing unit 33, with the second image obtained through divided exposure sent next. The image resulting from composing the stated first and second images is copied by the image copying unit 34 prior to being composed with the third image obtained through divided exposure, which is sent thereafter, and after undergoing the same various processes performed by the image processing unit 24 on the first image, is recorded and saved into the recording medium 15. In this manner, when sequentially composing the images obtained through divided exposure up until the end of capturing, each pre-composition image is copied by the image copying unit 34, and is recorded and saved into the recording medium 15.

When the capturing ends in step S19, the slow shutter speed exposure image that is ultimately composed undergoes white balance adjustment, image compression processing, and so on by the image processing unit 24, and is then recorded and saved into the recording medium 15. In step S20, each pre-composition history image and the post-composition image saved in the recording medium 15 are sent to the display control unit 26 by the image recording and reading unit 14 when the image playback button 16 is pressed, pass through the D/A conversion circuit 27, and are displayed in the display unit 17.

As described thus far, according to the present embodiment, history images during slow shutter speed exposure capturing are recorded and saved for each amount of time that is set as desired, which makes it possible to prevent failed images from occurring during slow shutter speed capturing. Furthermore, starting the copying and saving of history images when the given brightness $C_{Tn}$ is reached ensures that unnecessary dark images are not saved, which in turn makes it possible to shorten the processing time and prevent the wasteful consumption of the capacity of the recording medium.

Although the present embodiment describes an example in which the copying and saving of history images starts when the given brightness $C_{Tn}$ is reached, the present invention is not limited thereto. For example, using the exposure time set for the final slow shutter speed exposure image as a reference, the copying and saving may start from the history image generated a predetermined amount of time before the stated exposure time.

Although embodiments of the present invention have been described above, the present invention is not intended to be limited to these embodiments, and many variations and alterations are possible within the scope thereof.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-153479, filed Jul. 5, 2010, which is hereby incorporated by reference herein in its entirety.

What is claimed is:

1. An image capture apparatus comprising:

a capturing unit that captures an object image and generates image data;

a first setting unit that sets a first exposure time for the capturing unit;

a second setting unit that sets a second exposure time in which the capturing unit obtains each of a plurality of image data;

a composition unit that generates composite image data in which the plurality of image data have been composed, wherein total exposure time of the plurality of image data corresponds to the first exposure time;

a recording control unit that records, into a recording medium, the composite image data generated by the composition unit and a plurality of history image data generated by sequentially composing the image data of the second exposure time, obtained from the capturing unit, that has been sequentially generated up until the composite image data has been generated; and a detection unit that detects the brightness of the history image data sequentially generated by the composition unit, wherein of the history image data sequentially generated by the composition unit, the recording control unit selectively records image data, whose brightness as detected by the detection unit exceeds a predetermined value, in the recording medium.

2. The apparatus according to claim 1, wherein the recording control unit does not record the history image data corresponding to brightness which does not reach to brightness that is lower than an appropriate brightness by a predetermined value.

3. The apparatus according to claim 1, further comprising:

a selection unit that is selectable using divided exposure which divides the first exposure time and uses continuous exposure.

4. The apparatus according to claim 1, wherein the second setting unit sets a second exposure time based on an exposure time inputted by a user in a user operation.

5. The apparatus according to claim 1, wherein the recording control unit compresses the history image data and records the compressed history image data in the recording medium.

6. A control method for an image capture apparatus including a capturing unit that captures an object image and generates image data, the method comprising the steps of:

setting a first exposure time for the capturing unit;

setting a second exposure time in which the capturing unit obtains each of a plurality of image data;

generating composite image data in which the plurality of image data have been composed, wherein total exposure time of the plurality of image data corresponds to the first exposure time;

recording, into a recording medium, the composite image data generated in the step of generating and a plurality of history image data generated by sequentially composing the image data of the second exposure time, obtained from the capturing unit, that has been sequentially generated up until the composite image data has been generated; and detecting the brightness of the history image data sequentially generated in the step of generating, wherein in the step of recording, of the history image data sequentially generated in the step of generating, image data whose brightness as detected in the step of detecting exceeds a predetermined value are selectively recorded in the recording medium.

7. A non-transitory computer readable recording medium storing a program causing a computer to execute a control method for an image capture apparatus including a capturing unit that captures an object image and generates image data, the method comprising the steps of:

setting a first exposure time for the capturing unit;

setting a second exposure time in which the capturing unit obtains each of a plurality of image data;

generating composite image data in which the plurality of image data have been composed, wherein total exposure time of the plurality of image data corresponds to the first exposure time;

recording, into a recording medium, the composite image data generated in the step of generating and a plurality of history image data generated by sequentially composing the image data of the second exposure time, obtained from the capturing unit, that has been sequentially generated up until the composite image data has been generated; and detecting the brightness of the history image data sequentially generated in the step of generating, wherein in the step of recording, of the history image data sequentially generated in the step of generating, image data whose brightness as detected in the step of detecting exceeds a redetermined value are selectively recorded in the recording medium.

* * * * *